US011356331B2

(12) United States Patent
Gupta et al.

(10) Patent No.: US 11,356,331 B2
(45) Date of Patent: Jun. 7, 2022

(54) WIRELESS CONFIGURATION DIAGNOSIS FRAMEWORK (71) Applicant: Cisco Technology, Inc., San Jose, CA (US)

(72) Inventors: Manoj Gupta, Bangalore (IN); Sourav Chakraborty, Fremont, CA (US); Venkata Prathyusha Kuntupalli, Milpitas, CA (US); Rajesh S. Pazhyannur, Fremont, CA (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 189 days.

(21) Appl. No.: 16/455,163

(22) Filed: Jun. 27, 2019

(65) Prior Publication Data
US 2020/0412620 A1 Dec. 31, 2020

(51) Int. Cl.
H04L 12/24 (2006.01)
H04W 76/10 (2018.01)
H04L 41/14 (2022.01)
H04W 84/12 (2009.01)

(52) U.S. Cl.
CPC ............ H04L 41/14 (2013.01); H04W 76/10 (2018.02); H04W 84/12 (2013.01)

(58) Field of Classification Search
CPC ..... H04L 41/0866; H04L 41/14; H04L 43/14; H04W 76/10; H04W 84/12
See application file for complete search history.

(56) References Cited

U.S. PATENT DOCUMENTS

| 8,243,705 | B2* | 8/2012 | Palm | H04L 69/24 370/338 |
| 9,185,063 | B1* | 11/2015 | Kumar | H04L 51/043 |
| 2002/0071421 | A1* | 6/2002 | Chiu | H04L 1/1877 370/349 |
| 2012/0155349 | A1* | 6/2012 | Bajic | H04L 69/32 370/311 |
| 2013/0230040 | A1* | 9/2013 | Adachi | H04W 52/0209 370/349 |
| 2015/0023236 | A1* | 1/2015 | Choi | H04W 52/0225 370/311 |
| 2017/0078052 | A1* | 3/2017 | Matsuo | H04L 1/1861 |
| 2017/0118165 | A1* | 4/2017 | Kumar | G06F 16/9537 |
| 2018/0060738 | A1* | 3/2018 | Achin | G06Q 10/04 |
| 2018/0062713 | A1* | 3/2018 | Adachi | H04W 16/28 |
| 2018/0077723 | A1* | 3/2018 | Adachi | H04L 5/0091 |
| 2018/0279130 | A1* | 9/2018 | Huang | H04W 24/02 |

* cited by examiner

Primary Examiner — Alpus Hsu
(74) Attorney, Agent, or Firm — Merchant & Gould P.C.

(57) ABSTRACT

Wireless configuration diagnosis framework may be provided. A label for a choreography comprising a sequence of frames to be exchanged between a first access point and a first client device may be created by a controller. A reference footprint for the choreography may be created. The reference footprint may comprise, for each frame of the sequence of frames, a frame type, an information element for the frame type, and a bit value for the information element. The reference footprint may be sent to the first access point. A plurality of frames exchanged between the first access point and the first client device associated with the choreography and an outcome for the choreography may be received from the first access point in response to the choreography being triggered.

20 Claims, 4 Drawing Sheets

WIRELESS CONFIGURATION DIAGNOSIS FRAMEWORK

TECHNICAL FIELD

The present disclosure relates generally to wireless networking.

BACKGROUND

With the proliferation of wireless devices, Wireless Local Area Network (WLAN) systems allow networking benefits to a multiplicity of client devices. WLAN deployments may include access points to provide wireless coverage. Access points connect to a wired Ethernet connection and provide wireless connections using radio frequency links to the client devices so that the client devices may utilize the wired Ethernet connection. Several access points may work in coordination under the control of a central controller to provide services to the client devices. Client devices connect to the Ethernet connection by associating with the access points.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Wireless configuration diagnosis framework may be provided. A label for a choreography comprising a sequence of frames to be exchanged between a first access point and a first client device may be created by a controller. A reference footprint for the choreography may be created. The reference footprint may comprise, for each frame of the sequence of frames, a frame type, an information element for the frame type, and a bit value for the information element. The reference footprint may be sent to the first access point. A plurality of frames exchanged between the first access point and the first client device associated with the choreography and an outcome for the choreography may be received from the first access point in response to the choreography being triggered.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

Wireless technology has evolved through many generations. Each of these generations has introduced new features to enhance the user experience. However, the introduction of the new features may have introduced challenges for access points. For example, the access points may have to maintain backward compatibility with legacy client devices while supporting new protocols and features. Maintaining backward compatibility may have an impact on software development where a significant amount of time goes to ensuring that various configuration options may be provided for various customers.

For example, the access points may be configured to support hundreds of different type client devices, each with multiple possible hardware and software versions. A new software release on either the client device or the access point may require long hours of testing to ensure that the new software release allows for the intended new functions without breaking prior feature sets.

For example, with the new software release, the access points may announce feature support in discovery probes or other management frames. The access points, however, may fail to properly activate the feature or fail to react upon message exchanges. These failures may make it difficult to determine if the issue originates from the client device or the access point configuration. Similarly, the access points or the client devices may modify support for existing mechanisms. Such modifications may change, for example, an intended choreography (e.g., triggers, messaging logic etc.). This change may result in unexpected behaviors (which impact performance), feature activation failures, or feature deactivation failures.

As a side effect, the complexity of the feature set may also be sensed in access points. For example, the complexity of the feature set may cause logic failures, where some features may be configured, but activated differently (or fail to be activated) on different access point models or software releases. Given a large number of feature combinations, it may be difficult to test all combinations and ensure that a set of feature may be consistently activated on a target access point. For example, access point software may comprise, for example, a million lines of code, calling and cross referencing one another making testing of the software both time consuming and prone to failures.

Manual software testing, which may be the current practice, may be limited. For example, manual testing may be difficult to scale to cover each scenario resulting from the update of the software. Any missed scenario may result in a silent fail that may not be discovered. Hence, there may be a need to automatically detect configuration or feature support mismatches that may be identified for an administrator or technical support for example.

Embodiments of the disclosure may provide processes for configuration diagnosis. The disclosed processes may provide a framework for detecting and notifying out of sync configurations for access points and client devices associated with the access points. The processes may also allow automatic action or manual assistance to resolve the detected out of sync configurations.

Figure 1:
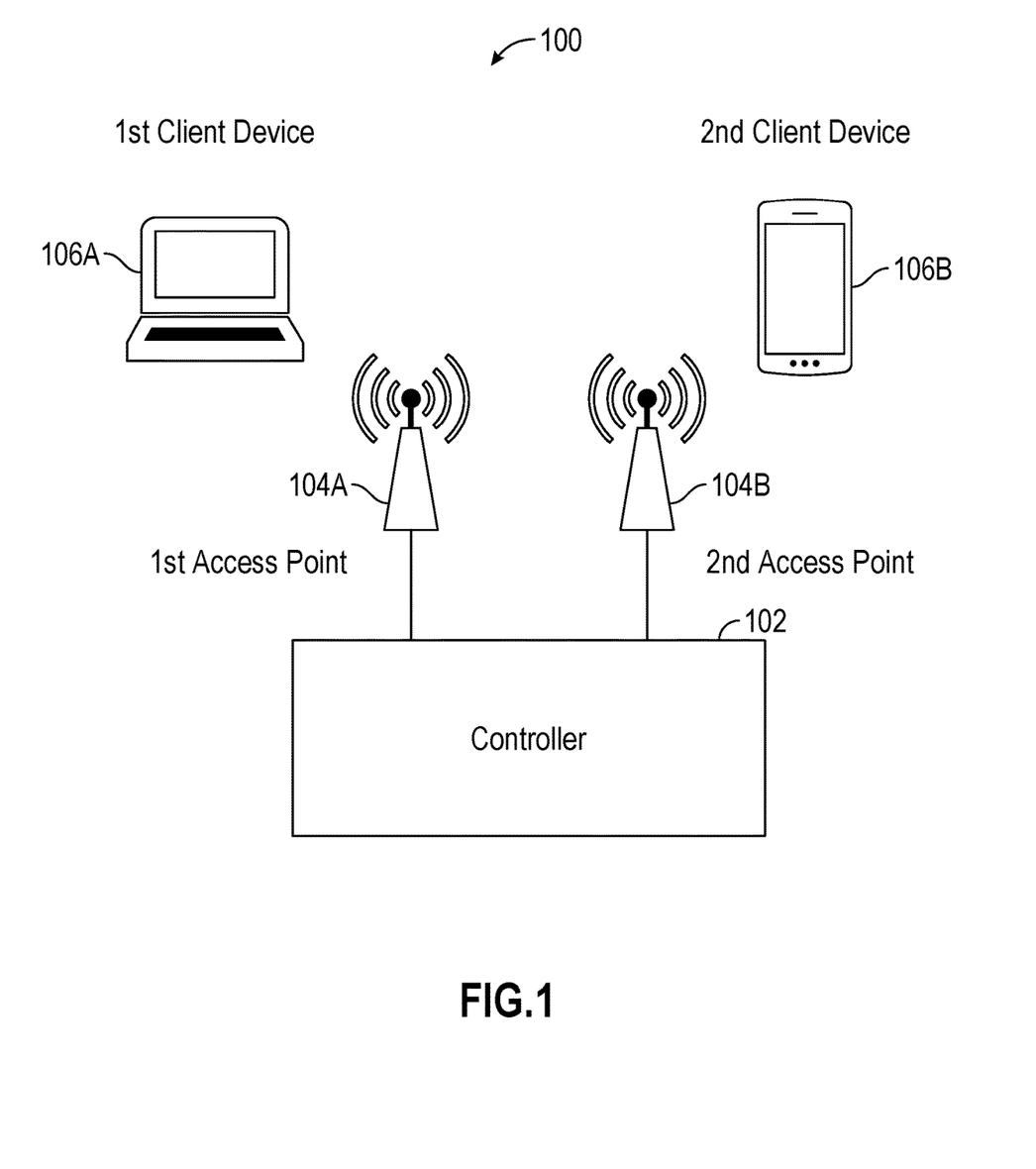
FIG. 1 is a block diagram of an operating environment.

FIG. 1 illustrates an example operating environment 100. Operating environment 100 may be a Wireless Local area Network (WLAN). As shown in FIG. 1, operating environment 100 may include a controller 102, a plurality of access points 104, and a plurality of client devices 106. Controller 102 may coordinate with plurality of access points 104, for example, a first access point 104A and a second access point 1046 to provide the WLAN in a predefined geographical area. Plurality of access points 104 may grow or shrink based on the extent of the geographical area, and therefore may comprise any number and is not limited to two. Plurality of access points 104, for example, may implement a WLAN protocol specified in the IEEE 802.11 specification.

Plurality of access points 104 may wirelessly communicate with plurality of client devices 106, for example, a first client device 106A and a second client device 106B. Each one of plurality of client devices 106 may comprise, but are not limited to, a cable modem, a cellular base station, a tablet device, a mobile device, a smart phone, a telephone, a remote control device, a set-top box, a digital video recorder, an internet of things (IoT) device, a personal computer, a network computer, a mainframe, a router, or other similar microcomputer-based device. Plurality of client devices 106 may grow or shrink and therefore may comprise any number of client devices and are not limited to two.

Plurality of client devices 106 may associate with plurality of access points 104 by exchanging messages, also referred to as management frames, in a predefined sequence, also referred to as a choreography, to form a connection status. For example, one or more of plurality of access points 104, for example, first access point 104A may periodically send beacons to announce its presence and relay information that may be needed by plurality of client devices 106 to associate with first access point 104A. In addition, one or more of plurality of client devices 106, for example, first client device 106A may send a probe request to discover networks within its proximity. The probe request may advertise supported data rates and capabilities of first client device 106A.

One or more of plurality of access points 104, for example, first access point 104A, upon determining that it shares a common data rate of the probe request may send a probe response to first client device 106A. First client device 106A, upon receiving the probe response, may send an authentication request to first access point 104A. In response to the authentication request, first access point 104A may send an authentication response. After receiving the authentication response, first client device 106A may send an association request. In response to the association request, first access points 104A may create an association ID for first client device 106A and respond to the association request with an association response with a success message granting network access to first client device 106A. The aforementioned sequence of message exchange may be referred to as a choreography for an association process. The intent of the association process may be determined as establishing connection.

In addition to the management frames, plurality of client devices 106 and plurality of access points 104 may exchange control frames and data frames. For example, after a connection is established, first client device 106A may exchange data frames and control frames with first access point 104A. A sequence, a format, and Information Elements (IEs) of the frames exchanged between first access point 104A and first client device 106A may be predefined. For example, a vendor of first client device 106A and a vendor or first access point 104A may predefine the sequence, the format, and the IEs of the frames. The processes disclosed herein may use the predefined sequence, format, IEs, and values in the IEs of the frames to perform configuration diagnosis of plurality of access points 104 and plurality of client devices 106.

Elements of operating environment 100 (i.e., controller 102, plurality of access points 104, and plurality of client devices 106 may be practiced in hardware and/or in software (including firmware, resident software, micro-code, etc.) or in any other circuits or systems. Elements of operating environment 100 may be practiced in electrical circuits comprising discrete electronic elements, packaged or integrated electronic chips containing logic gates, a circuit utilizing a microprocessor, or on a single chip containing electronic elements or microprocessors. Elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, elements of operating environment 400 may be practiced in a computing device 400.

Figure 2:
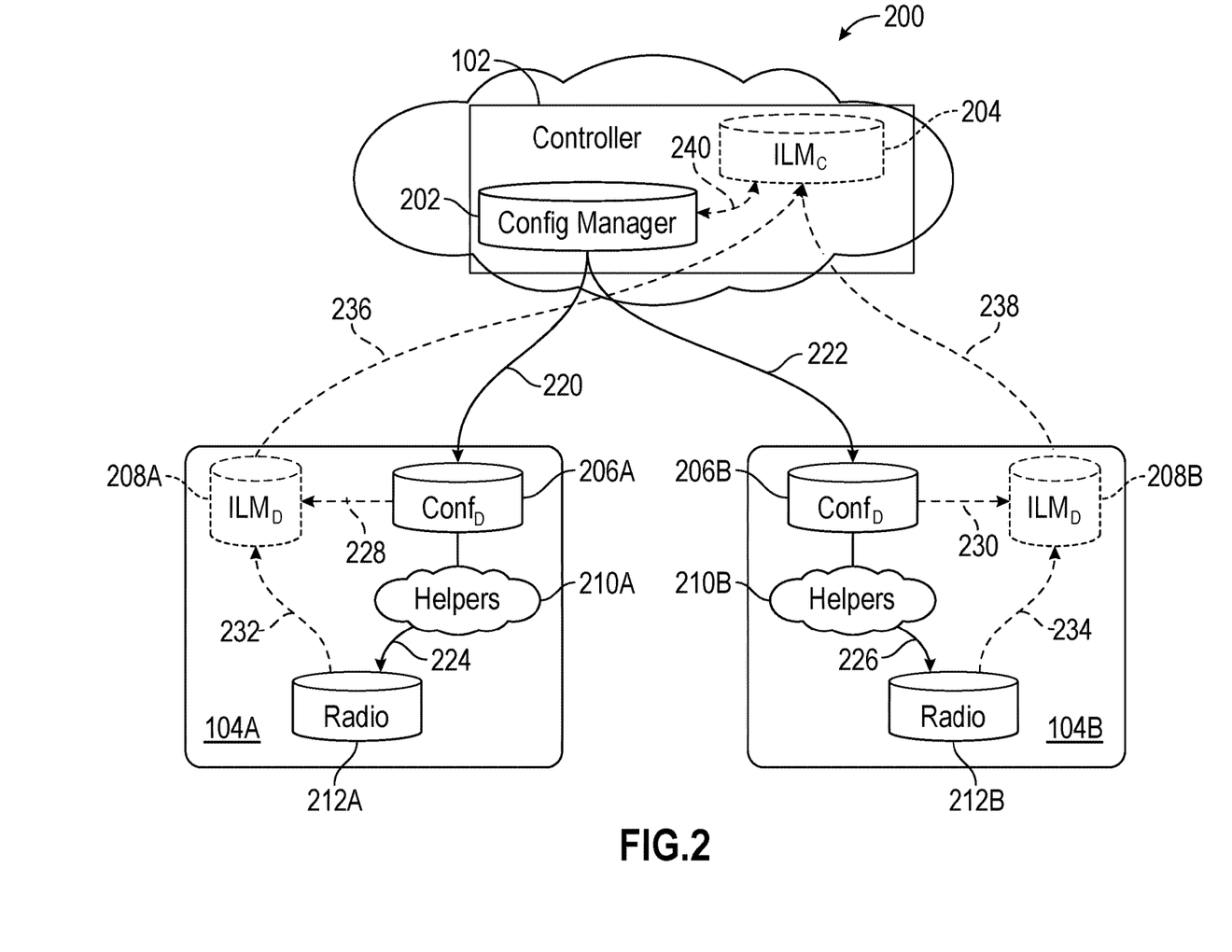
FIG. 2 is a block diagram of a framework for configuration diagnosis.

FIG. 2 illustrates a wireless configuration diagnosis framework 200. As shown in FIG. 2, framework 200 may include a configuration manager 202 and an Index Lifecycle Management Collector (ILMc) 204. Configuration manager 202 and ILMc 204 may be deployed on 102. Framework 200 may further include a first configuration agent (Conf$_D$) 206A, a first Index Lifecycle Management Agent (ILM$_D$) 208A, first helpers 210A, a first radio 212A, a second Conf$_D$ 206B, a second ILM$_D$ 208B, second helpers 210B, and a second radio 212B. First Conf$_D$ 206A, first ILM$_D$ 208A, first helpers 210A, and first radio 212A may be located on first access point 104A. Second Conf$_D$ 206B, second ILM$_D$ 208B, second helpers 210B, and second radio 212B may be located on second access point 104B.

Vendors of plurality of access points 104 may implement features following a template for the frames. The template may include the following components: i) expected frame types (e.g., management, control, data, etc.); ii) expected choreography (e.g., access point starts, sends a request A, client device responds with an answer B etc.); and iii) expected bits and fields (e.g., request A has field X with bits 5 and 6 set to 1, etc.). The template may be stored in configuration manager 202. For example, a combination of frame types, IEs of interest, and exchange sequence received from the vendors for a choreography may be stored in configuration manager 202. Each combination may be stored along with a label expressing an intent (e.g., unsolicited Basic Service Set (BSS) Transfer Management (BTM) exchange) of the choreography.

Configuration manager 202 may convert the label into a set of configuration instructions for each of plurality of access points 104. Configuration manager 202 may send the respective configuration instructions to each of plurality of access points 104, for example, first access point 104A and second access point 104B (arrows 220 and 222 respectively). In example embodiments, configuration manager 202 may translate each intent into different sets of commands based on software or hardware type for each of plurality of access points 104. Each of plurality of access points 104 may receive the respective set of commands from configuration manager 202. For example, first Conf$_D$ 206A may receive a first set of commands for first access point 104A and second Conf$_D$ 206B may receive a second set of commands for second access point 104B.

After receiving the first set of commands, first $Conf_D$ 206A may validate and apply the first set of commands to first radio 212A via first helpers 210A (arrow 224). Similarly, second $Conf_D$ 206B may validate and apply the second set of commands to second radio 212B via second helpers 210B (arrow 226). First helpers 210A may execute set of commands to first radio 212A and second helpers 210B may execute the second set of commands to second radio 212B. Moreover, first $ILM_D$ 208A and second $ILM_D$ 208B may each store an exchange footprint (e.g., which bits of which fields are set to which value) for the associated label. For example, each of first $ILM_D$ 208A and second $ILM_D$ 208B may receive the exchange footprints from first $Conf_D$ 206A and second $Conf_D$ 206B respectively (arrows 228 and 230). The exchange footprint may further include lower level parameters (e.g., scrambler parameters).

A validation phase may start after the label creation. At the validation phase, the features may be tested. For example, the features may be tested against plurality of client devices 106. During the testing, each time a target exchange is started, the exchanged frames may be copied. The target exchange may include frames exchanged corresponding to a choreography, for example, a BTM exchange. The frames exchanged by first access point 104A may be copied in first $ILM_D$ 208A and the frames exchanged by second access point 104B may be copied in second $ILM_D$ 208B. First $ILM_D$ 208A and second $ILM_D$ 208B may apply a pattern matching filter to the exchanged frames and detect: i) other IEs; and ii) in each IEs, bits values (e.g., 0 or 1).

The filtered frames from the validation phase may be returned to configuration manager 202. Configuration manager 202 may classify and store the possible frame and IE combinations from the filtered frames from the validation phase. The possible frame and IE combinations may be stored in a random forest classification process. For example, the random forest classification process may be used to organize the frame and IE combinations (e.g., field A always has bits xyz set to 1; when field A is present, field B has to be present with values 123 set to 1 and possibly values 456 set to 0 or 1, etc.) for the choreography. Other classification processes may also be used to store the possible frame and IE combinations.

In example embodiments, a data set for the possible frame and IE combinations may become large when each possible bit value of each possible field for a given exchange are captured. The random forest classification used by embodiments of the disclosure may concatenate this structure. In addition, the possible frame and IE combinations may be stored on a database on controller 102. The database, which may operate with a graph structure, may store the possible frame and IE combinations for each possible exchange corresponding to a choreography in the database, and may not be limited by size.

The possible frame and IE combinations from the validation phase may be provided to each of first $ILM_D$ 208A and second $ILM_D$ 208B with a filter format. The filter format may be in the form of 'alert if', 'ignore if'. The filter format may allow each of first $ILM_D$ 208A and second $ILM_D$ 208B to ignore normal exchanges during an assurance phase, and report anomalies.

The assurance phase may start after the validation phase. The assurance phase may include field deployment, that is, plurality of access points 104 servicing plurality of client devices 106 in the WLAN. In the assurance phase, one or more new client devices from the same of different vendors may associate with plurality of access points 104. In addition, new access points may join the WLAN. Moreover, new software from the validation phase may be deployed on one or more of plurality of access points 104.

In example embodiments, during the assurance phase, each of first radio 212A and second radio 212B may monitor frames exchanged with respective plurality of client devices 106. More specifically, each of first radio 212A and second radio 212B may compare the frames being exchanged with the filter format. When a target feature matching one of the known labels is detected on any of plurality of access points 104, the frames associated with the target feature and sent and received by any of first radio 212A and second radio 212B may be copied to first $ILM_D$ 208A and second $ILM_D$ 208A respectively (arrows 232 and 234). First $ILM_D$ 208A and second $ILM_D$ 208A may compare the copied frames with a stored reference exchange (Desired Configuration (Dcfg)) and a label.

A first outcome of the comparison may include that the choreography completed successfully and that the exchanged frames exist in Dcfg. Successfully completed choreographies may be returned to controller 102 and recorded for a matching client device and a label (arrows 236 and 238). A second outcome may include that the choreography completed successfully, but bits or IEs not present in the Dcfg (or present with an alert flag). First $ILM_D$ 208A and second $ILM_D$ 208B may return these frames to controller 102 (arrows 236 and 238 respectively), which then may label this combination 'inconsequential'. This combination may be used for reinforcement learning, where new frame structures may be learned (e.g., 'field A with bits 123 set to 1=failure' in reference model, but 'field A with bits 123 set to 1 AND field B with bits 456 set to 0=success'). A third outcome of the comparison may comprise the choreographs not completing successfully (e.g., failure). First $ILM_D$ 208A and second $ILM_D$ 208B may also returns these frames to controller 102 (arrows 236 and 238 respectively), along with relevant elements (e.g., client device MAC, signal characteristics etc.) Controller 102 may compare the returned frames to a label and footprint model. The comparison may be used to automate analysis and remediation in the assurance phase. For example, $ILM_C$ 204 may use a comparison to update the Dcfg stored in configuration manager 202 (arrow 240).

For example, in the assurance phase, ILMc 204 may parse the exchanged frames through existing filters (e.g., identifying issues such as low Received Signal Strength Indicator (RSSI) and well known failure reasons codes returned by elements such as controller 102). If an existing filters find an issue with the exchanged frames, then passing of the exchanged frames may stop when a failure reason code is found (e.g., 'exchange failed because of client low RSSI').

If no reason is found through existing filters, ILMc 204 may parse the exchanged frames for further processing along an additional decision tree. For example, ILMc 204 may determine that: i) a last frame comes from a client device (e.g. one of plurality of client devices 106), an answer was expected from one of plurality of access points 104 (or vice versa); ii) a last frame was a question/request and no response was received to the question/request; iii) a last frame was a response, further exchange was expected, but not seen (e.g., authorization response was sent, association request did not follow); or iv) a last frame was a state report expected to trigger a new exchange (e.g., an 11 k scan request was sent to STA, STA acknowledged and went scan away, but never initiated the 11 k report exchange).

For each of these cases, ILMc 204 may run the exchanged frames through a label filter to identify deviations and warnings. For example, ILMc 204 may determine that: i)

fields are present in the exchanged frames, but not documented in the reference footprint or a knowledge database associated to the exchange label; ii) new or unexpected fields; iii) fields that are associated to the exchange label and known, and which display unexpected values in the exchanged frames—field missing, malformed, or with wrong bit values; iv) fields that are known to the knowledge base, that are labelled as non-essential/irrelevant, and that display unknown values (e.g., bits set to values not observed before); or iv) frames that are not expected as part of the exchanged frames, and that were observed (from either side) during the exchange phase. ILMc 204 may also observe cases where none of the scenarios listed above were observed, but the exchange still stopped.

For any detected scenarios, the information may be returned to an assurance process. For example, when the issue is detected on the access point side, a call-home feature may be initiated to alert developers. In addition, when the issue is detected on the client side, the issue may be injected into the assurance process to collect client details (e.g., hardware version, software version where available, brand etc.). The assurance process may parse through the collected client details to identify other clients for which successfully completed the choreography. This information may be used to trigger an administration alert with specific information. An example alert may comprise, for example, "S10 with Android 9.1 has no issue with Basic Service Set (BSS) Transfer Management (BTM) requests. However, S10 with Android 9.2 fails on BTM <click details>→S10 with 9.2 sets the BTM support IE bit 5 to 0 while it should be set to 1".

In example embodiments, when the issue is detected on the access point side, a call-home feature may be initiated to alert developers. In addition, in parallel, ILMc 204 may parse non-essential fields to identify their associated label. An automated configuration change response may be initiated, or a warning may be displayed to the administrator. An example warning message, for example, may include "first access point 104A running SW code 16.10.23 does not respond to BTM when Adaptive 11r is also enabled. Click <here> to turn off BTM or <here> to turn off adaptive 11r on the WLAN (or continue and ignore the warning). Moreover, when the issue is detected on the client side, the same process as above may be initiated, with an additional suggestion to change the client profile (e.g., disable one of the associated features). With the above framework 200, controller 102 may identify and report on exchange failures and may also identify root causes of the failures.

Figure 3:
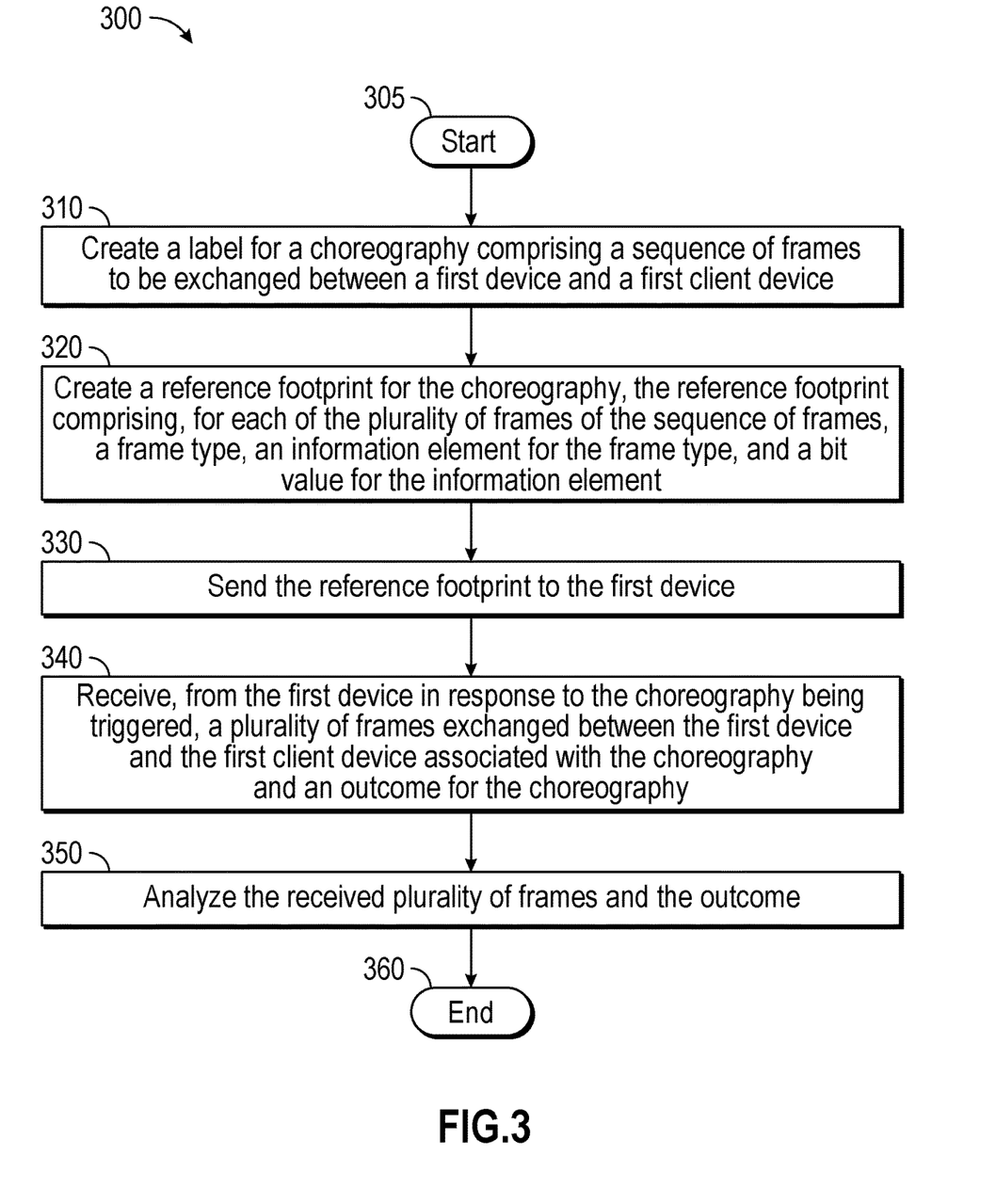
FIG. 3 is a flow chart of a method for configuration diagnosis.

FIG. 3 is a flow chart setting forth the general stages involved in a method 300 consistent with an embodiment of the disclosure for configuration diagnosis. Method 300 may be implemented in operating environment 100 as described in more detail above with respect to FIG. 1. For example, method 300 may be implemented by configuration manager 202 and $ILM_C$ 204 of controller 102 of operating environment 100. Ways to implement the stages of method 300 will be described in greater detail below.

Method 300 may begin at starting block 305 and proceed to stage 310 where a label for a choreography comprising a sequence of frames to be exchanged between a first device (e.g., first access point 104A) and first client device 106A may be created. For example, controller 102 may receive a choreography comprising the sequence of frames to be exchanged from vendors of plurality of access points 104. Controller 102 may create a label for the choreography and provide the label to configuration manager 202. The choreography may include a software code that may be deployed on plurality of access points 104. The software code may enable plurality of access points 104 to process and response to frames received from plurality of client devices 106.

From stage 310, where the label for the choreography comprising the sequence of frames to be exchanged between the first device and first client device 106A, method 300 may advance to stage 320 where a reference footprint for the choreography may be created. The reference footprint may comprise, for each frame of the sequence of frames, a frame type, an information element for the frame type, and a bit value for the information element. For example, configuration manager 202 may create the reference footprint from the choreography by parsing the sequence of frames and testing the sequence of frames on plurality of access points 104.

Once the reference footprint for the choreography is created in stage 320, method 300 may continue to stage 330 where the reference footprint may be sent to the first device. For example, configuration manager 202 may send the reference footprint to first access point 104A. The reference footprint may be received at first $Conf_D$ 206A of first access point 104A. First $Conf_D$ 206A may provide the received reference footprint to first $ILM_D$ 208A. In addition, a first set of instructions corresponding to the choreography may be sent to first radio 212A.

After sending the reference footprint to the first device in stage 330, method 300 may proceed to stage 340 where, in response to the choreography being triggered, a plurality of frames exchanged between the first device and first client device 104A associated with the choreography and an outcome for the choreography may be received from the first device. For example, first radio 212A of first access point 104A may copy frames corresponding to the choreography when the choreography is triggered at first access point 104A. The copied frames may be sent to first $ILM_D$ 208A. First $ILM_D$ 208A may monitor an outcome of the choreography and provide the frames and outcome to configuration manager 202.

After receiving the plurality of frames and the outcome of the choreography in stage 340, method 300 may continue to stage 350 where the receive plurality of frames and the outcome of the choreography may be analyzed. For example, configuration manager 202 may analyze the received frames and the outcome to enhance the reference footprint and provide a feedback to an administrator. Configuration manager 202 may determine a reason for failure of completion of the choreography and provide an alert and data associated with the failure to the administrator. Once the received plurality of frames and the outcome of the choreography are analyzed in stage 350, method 300 may then end at stage 360.

Figure 4:
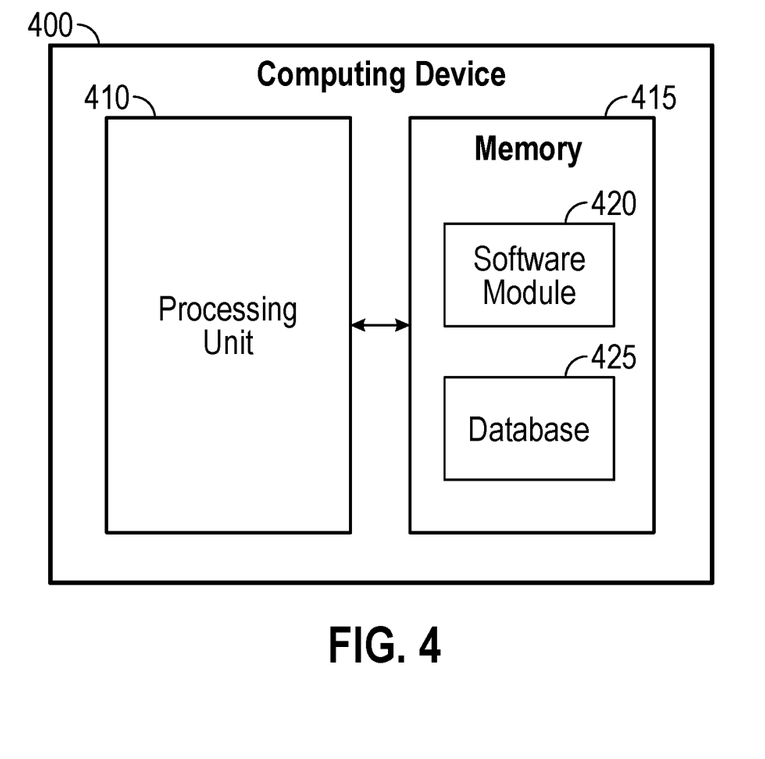
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for configuration diagnosis, including for example, any one or more of the stages from method 300 described above with respect to FIG. 3. Computing device 400, for example, may provide an operating environment for controller 102, individual access points of plurality of access points 104, individual client devices of plurality of client devices 106, configuration manager 202, ILMc 204, first $Conf_D$ 206A, second $Conf_D$ 206B, first $ILM_D$ 208A, second $ILM_D$ 208B, first helpers 210A, and second helpers 210B. Controller 102, plurality of access points 104, plurality of client devices 106, configuration manager 202, $ILM_C$ 204, first $Conf_D$ 206A, second $Conf_D$ 206B, first $ILM_D$ 208A, second $ILM_D$ 208B, first helpers 210A, and second helpers 210B may operate in other environments and is not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

According to example embodiments, a method may comprises creating, by a controller, a label for a choreography comprising a sequence of frames to be exchanged between a first access point and a first client device; creating a reference footprint for the choreography, the reference footprint comprising, for each frame of the sequence of frames, a frame type, an information element for the frame type, and a bit value for the information element; sending the reference footprint to the first access point; and receiving, from the first access point in response to the choreography being triggered, a plurality of frames exchanged between the first access point and the first client device associated with the choreography and an outcome for the choreography.

Receiving the outcome of the choreography may comprise receiving the outcome comprising successful completion of the choreography. Receiving the outcome of the choreography may comprise receiving the outcome comprising successful completion of the choreography and at least one of the plurality of frames comprising at least one of: a different information element and a different bit value from the reference footprint. The method may further comprise incorporating the different information element and the different bit value in the reference footprint of the choreography.

In example embodiments, receiving the outcome of the choreography comprises receiving the outcome comprising failed completion of the choreography. The method may further comprise parsing the received plurality of frames to determine a failure reason from a predetermined list of failure reasons for the failed completion of the choreography. The method may further comprise categorizing a last frame of the plurality of frames to be at least one of: originated from at least one of the first access point and a second access point; a request or a question and no response was received; a response for which further exchange was expected, but not received; and a state report expected to trigger a new exchange.

The method may further comprise identifying deviations in the last frame of the plurality of frames from the sequence of frames. Identifying the deviations may comprise identifying at least one of: one information element that is present in the last frame, but not present in a corresponding frame in the reference footprint; one information element that is present both in the last frame and a corresponding frame in the reference footprint and comprises an unexpected value comprising one of a missing data field, a malformed field, and wrong bit value; and one or more frames that are not expected to be part of the choreography. The method may further comprise, in response to determining that the last frame of the plurality of frames originated from the first access point, and in response to determining that the last frame originated from the first access point, sending an alert to an administrator of the first access point.

According to example embodiments, the method may further comprise, in response to determining that the last frame of the plurality of frames originated from the first client device: sending a trigger to the first access point to collect one or more characteristics of the client device; receiving the one or more characteristics of the first client device; determining a second client device with the successful completion of the choreography; and sending an alert to an administrator, the alert comprising the one or more characteristics of the first client device along with an indication that the first client device failed completion of the choreography, and comparable characteristics of the second client device along with the indication that the second client device successfully completed the choreography. Categorizing the last frame of the plurality of frames may comprise categorizing the last frame of the plurality of frames in response to being unable to determine a failure reason from a predetermined list of failure reasons for the failed completion of the choreography.

In example embodiments, an apparatus may comprise: a memory storage; and a processing unit coupled to the memory storage, wherein the processing unit may be operative to: create a label for a choreography comprising a sequence of frames to be exchanged between an access point and a client device; create a reference footprint for the choreography, the reference footprint comprising, for each frames of the sequence of frames, a frame type, an information element for the frame type, and a bit value for the information element; send the reference footprint to the access point; and receive, from the access point in response to the choreography being triggered, a plurality of frames exchanged between the access point and the client device associated with the choreography and an outcome for the choreography, the outcome comprising one of the following: completion of the choreography and failed completion of the choreography.

In example embodiments, a computer-readable medium that may store a set of instructions when executed may perform a method executed by the set of instructions comprising: creating a label for a choreography comprising a sequence of frames to be exchanged between a first access point and a client device; creating a reference footprint for the choreography, the reference footprint comprising, for each frames of the sequence of frames, a frame type, an information element for the frame type, and a bit value for the information element; sending the reference footprint to the first access point; and receiving, from the first access point in response to the choreography being triggered, a plurality of frames exchanged between the first access point and the client device associated with the choreography and an outcome for the choreography, the outcome comprising one of the following: completion of the choreography and failed completion of the choreography.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method performed by a controller, the method comprising:
   creating a label for a choreography, the choreography comprising a predetermined sequence of frames to be exchanged between a first access point and a first client device, wherein the label expresses an intent of the choreography;
   creating a reference footprint for the choreography, the reference footprint comprising, for each frame of the predetermined sequence of frames, a frame type, an information element for the frame type, and a bit value for the information element, wherein a combination of the frame type, the information element for the frame type, and the bit value for the information element of the choreography is stored along with the label for the choreography;
   sending the reference footprint to the first access point;
   receiving, from the first access point in response to the choreography being triggered, a plurality of frames exchanged between the first access point and the first client device associated with the choreography; and
   receiving an outcome for the choreography.

2. The method of claim 1, wherein receiving the outcome of the choreography comprises receiving the outcome comprising successful completion of the choreography.

3. The method of claim 1, wherein receiving the outcome of the choreography comprises receiving the outcome comprising successful completion of the choreography and at least one of the plurality of frames comprising at least one of: a different information element and a different bit value from the reference footprint.

4. The method of claim 3, further comprising incorporating the different information element and the different bit value in the reference footprint of the choreography.

5. The method of claim 1, wherein receiving the outcome of the choreography comprises receiving the outcome comprising failed completion of the choreography.

6. The method of claim 5, further comprising parsing the received plurality of frames to determine a failure reason from a predetermined list of failure reasons for the failed completion of the choreography.

7. The method of claim 5, further comprising categorizing a last frame of the plurality of frames to be at least one of:
   originated from at least one of the first access point and a second access point;

a request or a question and no response was received;
a response for which further exchange was expected, but not received; and
a state report expected to trigger a new exchange.

8. The method of claim 7, further comprising identifying deviations in the last frame of the plurality of frames from the predetermined sequence of frames.

9. The method of claim 8, wherein identifying the deviations in the last frame of the plurality of frames from the predetermined sequence of frames comprises identifying at least one of:
one information element that is present in the last frame, but not present in a corresponding frame in the reference footprint;
one information element that is present both in the last frame and a corresponding frame in the reference footprint and comprises an unexpected value comprising one of a missing data field, a malformed field, and wrong bit value; and
one or more frames that are not expected to be part of the choreography.

10. The method of claim 7, further comprising, in response to determining that the last frame of the plurality of frames originated from the first access point, and in response to determining that the last frame originated from the first access point, sending an alert to an administrator of the first access point.

11. The method of claim 7, further comprising, in response to determining that the last frame of the plurality of frames originated from the first client device:
sending a trigger to the first access point to collect one or more characteristics of the first client device;
receiving the one or more characteristics of the first client device;
determining a second client device with the successful completion of the choreography; and
sending an alert to an administrator, the alert comprising the one or more characteristics of the first client device along with an indication that the first client device failed completion of the choreography, and comparable characteristics of the second client device along with the indication that the second client device successfully completed the choreography.

12. The method of claim 7, wherein categorizing the last frame of the plurality of frames comprises categorizing the last frame of the plurality of frames in response to being unable to determine a failure reason from a predetermined list of failure reasons for the failed completion of the choreography.

13. An apparatus comprising:
a memory storage; and
a processing unit coupled to the memory storage, wherein the processing unit is operative to:
create a label for a choreography, the choreography comprising a predetermined a sequence of frames to be exchanged between an access point and a client device, wherein the label expresses an intent of the choreography;
create a reference footprint for the choreography, the reference footprint comprising, for each frames of the predetermined sequence of frames, a frame type, an information element for the frame type, and a bit value for the information element, wherein a combination of the frame type, the information element for the frame type, and the bit value for the information element of the choreography is stored along with the label for the choreography;
send the reference footprint to the access point;
receive, from the access point in response to the choreography being triggered, a plurality of frames exchanged between the access point and the client device associated with the choreography; and
receive an outcome for the choreography, the outcome comprising one of the following: completion of the choreography and failed completion of the choreography.

14. The apparatus of claim 13, wherein the outcome comprises failed completion of the choreography, and wherein the processing unit, in response to failed completion of the choreography, is further operative to parse the received plurality of frames to determine a failure reason from a predetermined list of failure reasons for the failed completion of the choreography.

15. The apparatus of claim 13, wherein the processing unit being operative to create the reference footprint for the choreography comprises the processing unit being operative to create the reference footprint for the choreography using a random forest process.

16. The apparatus of claim 13, wherein the processing unit being operative to create the reference footprint for the choreography comprises the processing unit being operative to create the reference footprint for the choreography using a directed graph.

17. The apparatus of claim 13, wherein the processing unit being further operative to parse the received plurality of frames to determine a reason for the failed completion of the choreography.

18. A non-transitory computer-readable medium that stores a set of instructions when executed perform a method executed by the set of instructions comprising:
creating a label for a choreography, the choreography comprising a predetermined a sequence of frames to be exchanged between a first access point and a client device, wherein the label expresses an intent of the choreography;
creating a reference footprint for the choreography, the reference footprint comprising, for each frames of the predetermined sequence of frames, a frame type, an information element for the frame type, and a bit value for the information element, wherein a combination of the frame type, the information element for the frame type, and the bit value for the information element of the choreography is stored along with the label for the choreography;
sending the reference footprint to the first access point;
receiving, from the first access point in response to the choreography being triggered, a plurality of frames exchanged between the first access point and the client device associated with the choreography; and
receiving an outcome for the choreography, the outcome comprising one of the following: completion of the choreography and failed completion of the choreography.

19. The non-transitory computer-readable medium of claim 18, wherein receiving the outcome comprises receiving the outcome comprising the failed completion of the choreography, and in response to receiving the failed completion of the choreography, parsing the received plurality of frames to determine a failure reason from a predetermined list of failure reasons for the failed completion of the choreography.

20. The non-transitory computer-readable medium of claim 18, wherein the instructions further comprising categorizing a last frame of the plurality of frames to be at least one of the following:
- originated from at least one of the following: the first access point and a second access point;
- a request or a question and no response was received;
- a response for which further exchange was expected but not received; and
- a state report expected to trigger a new exchange.

* * * * *